United States Patent [19]

Eckhardt et al.

[11] Patent Number: 4,806,619

[45] Date of Patent: Feb. 21, 1989

[54] THERMOTROPIC AROMATIC POLYESTERS HAVING A HIGH DEFLECTION TEMPERATURE UNDER LOAD AND EXCELLENT MECHANICAL PROPERTIES, A PROCESS FOR THEIR PREPARATION AND THEIR USE FOR THE PRODUCTION OF MOLDINGS, FILAMENTS, FIBRES AND FILMS

[75] Inventors: Volker Eckhardt; Hans-Rudolf Dicke, both of Krefeld; Erich Hammerschmidt, Bergisch Gladbach; Dieter Freitag, Krefeld, all of Fed. Rep. of Germany

[73] Assignee: Bayer Aktiengesellschaft, Leverkusen, Fed. Rep. of Germany

[21] Appl. No.: 914,669

[22] Filed: Oct. 2, 1986

[30] Foreign Application Priority Data

Oct. 4, 1985 [DE] Fed. Rep. of Germany ....... 3535452

[51] Int. Cl.$^4$ ................................................ C08G 8/02
[52] U.S. Cl. .................................. 528/128; 528/125; 528/126; 528/183
[58] Field of Search ................ 528/128, 125, 126, 183

[56] References Cited

U.S. PATENT DOCUMENTS

| | | | |
|---|---|---|---|
| 4,361,693 | 11/1982 | Jansons | 528/128 |
| 4,396,755 | 8/1983 | Rose | 528/126 |
| 4,539,386 | 9/1985 | Yoon | 528/128 |

*Primary Examiner*—John Kight
*Assistant Examiner*—Marvin L. Moore
*Attorney, Agent, or Firm*—Connolly and Hutz

[57] ABSTRACT

Thermotropic, fully-aromatic polyesters having a high content of 3,4'-benzophenonedicarboxylic acid radicals exhibit a combination, hitherto unknown, of good processability, high deflection temperature under load and very high strength and stiffness.

8 Claims, No Drawings

THERMOTROPIC AROMATIC POLYESTERS HAVING A HIGH DEFLECTION TEMPERATURE UNDER LOAD AND EXCELLENT MECHANICAL PROPERTIES, A PROCESS FOR THEIR PREPARATION AND THEIR USE FOR THE PRODUCTION OF MOLDINGS, FILAMENTS, FIBRES AND FILMS

The invention relates to high-molecular, thermotropic, fully-aromatic polyesters having a high deflection temperature under load, high stiffness and strength and low processing temperature, to a process for their preparation and to their use for the production of mouldings, filaments, fibres and films.

Substances which form liquid-crystal melts are described as "thermotropic". Thermotropic polycondensates are adequately known, see, for example, F. E. McFarlane et al., Liquid Crystal Polymers II, Contemporary Topics in Polymer Science, Volume 2, Plenum Publishing Corporation, 1977; W. J. Jackson and H. F. Kuhfuss, J. Polymer Science, Polymer Chem. Ed 14, 2042 (1976); W. C. Wooten et al. in A. Ciferri "Ultrahigh Modulus Polymers", Applied Science Publ., London 1979, pages 362 et seq.; A. Blumstein et al., "Liquid Crystalline Order in Polymers", Academic Press 1978; J. Preston, Angew. Makromol. Chem. 109/110, pages 1–19 (1982); A. Ciferri, W. R. Krigbaum, R. B. Meyer "Polymer Liquid Crystals", Academic Press, New York, 1982; EP Nos. 1,185, 1,340, 8,855, 11,640, 15,856, 17,310, 18,145, 18,709, 22,344, 44,205 and 49,615; U.S. Pat. Nos. 3,991,013, 3,991,014, 4,066,620, 4,067,852, 4,083,829, 4,107,143, 4,226,970, 4,232,143, 4,232,144, 4,245,082, 4,269,965, 4,335,232, 4,381,389, 4,399,270, 4,398,015 and 4,447,592; Japanese Pat. No. 59/126,431; and WO No. 79/797, 79/1030 and 79/1040.

The liquid-crystal state of polymer melts can be investigated by means of a polarization microscope: the eyepiece was equipped for the investigations with an attachment containing a photodiode located at the focal point of the eyepiece lens. The value recorded when the microscope was switched on with Nicol prisms arranged in parallel, in the absence of a sample of material, was adjusted to 100 scale divisions by means of an ancilliary measuring amplifier fitted with a control device. With crossed Nicol prisms, a value of 0.01 scale divisions was then obtained.

The layer thickness of the polycondensate melts examined was 100 μm.

The examination of the polycondensates was carried out after the samples had been melted at temperatures between 280° and 400° C. If there was a brightening of the melt observed between the crossed Nicol prisms within this total range or within a part thereof, the polycondensate was classified as thermotropically liquid-crystalline.

The liquid-crystal polycondensates exhibit values over 1 scale division in the measuring apparatus, in most cases values from 3 to 90 scale divisions. For amorphous melts, for example, aromatic polycarbonates, on the other hand, values less than 0.1 scale division were found.

The method described above is particularly suitable for rapid determination in the laboratory, and gives unambiguous results in virtually all cases. In doubtful cases, however, it can be useful to detect the presence of liquid-crystal components in the melt by means of X-ray wide-angle scattering, as described, for example, in G. W. Gray and P. A. Windsor, "Plastic Crystals, Physico-Chemical Properties and Methods of Investigation", in particular Chapter 3, John Wiley and Sons, New York, Sydney, Toronto, 1974.

Light-coloured materials of high strength and stiffness which are easy to process by thermoplastic means and which can also be employed even at fairly high temperatures are required for many applications, for example in the electrical and vehicle industries. The thermotropic polyesters hitherto disclosed do not, however, satisfy these requirements in all respects.

U.S. Pat. No. 4,500,699 describes thermotropic polyesters formed from 3,4'-benzophenonedicarboxylic acid, terephthalic acid and methylhydroquinone or chlorohydroquinone. Although these polyesters partially satisfy the requirements demanded, they have an unsatisfactory heat stability. At the temperatures required for their preparation or processing, discolorations which greatly limit their applicability are produced.

The object of the present invention was, therefore, to provide heat stable, thermotropic, fully-aromatic polyesters having a combination, hitherto unknown, of good processability, high deflection temperature under load and very high strength and stiffness.

Preferred new thermotropic, fully-aromatic polyesters should be processable by thermoplastic means below a temperature of 400° C., preferably below a temperature of 370° C. and particularly preferably below a temperature of 340° C.

The heat distortion point (without subsequent heat treatment) should, as a rule, be at least 160° C., preferably at least 180° C. and especially at least 200° C. (in each case determined by the Vicat B method, DIN 53,460, ISO 360).

It has now been found, surprisingly, that fully-aromatic polyesters composed predominantly of 3,4'-benzophenonedicarboxylic acid and certain unsubstituted diphenols exhibit the desired combination of advantageous properties.

The present invention relates to thermotropic aromatic polyesters containing recurring units of the formulae

and

wherein
Ar$^1$ consists, to the extent of 80 to 100 mol%, of radicals of the formula

and, to the extent of 20 to 0 mol%, of other divalent aromatic radicals which contain 6 to 18 C atoms and in which the chain-lengthening bonds are opposed coaxially or in parallel, and
Ar$^2$ consists, to the extent of 0 to 90, preferably 50 to 80, mol% of a 1,4-phenylene radical and, to the extent of 100 to 10, preferably 50 to 20, mol%, of other divalent aromatic radicals which contain 6 to 18 C atoms and in which the chain-lengthening bonds are opposed coaxially or in parallel to the extent of at least 80 mol% and are at an angle to the extent of not more than 20 mol%,
subject to the proviso that the I/II molar ratio is 0.95–1.05, preferably 0.98–1.02 and especially 1.0.

When radicals $Ar^1$ other than the radical of the formula III are used, note will be taken of the fact that the temperature at which the resulting polyesters can be processed by thermoplastic means will not exceed 400° C., preferably 370° C. and especially 340° C.

When use is made of diphenols resulting in radicals $Ar^2$ in which the chain-lengthening bonds are at an angle, the amount thereof must not exceed a level which causes the thermotropic properties of the resulting polyesters to be lost.

Examples of preferred dicarboxylic acids resulting in units I which are not derived from structure III are 4,4'-biphenyldicarboxylic acid, 4,4'-terphenyldicarboxylic acid, 4,4'-tolanedicarboxylic acid, 4,4'-stilbenedicarboxylic acid, 4,4'-azobenzenedicarboxylic acid and 1,4-, 1,5- and 2,6-naphthalenedicarboxylic acid. Terephthalic acid is particularly preferred.

Examples of preferred diphenols resulting in units II which are not derived from a 1,4-phenylene radical are 4,4'-dihydroxydiphenyl, 1,4-, 1,5- and 2,6-naphthalenediol, resorcinol, 4,4'-dihydroxydiphenyl ether, 4,4'-dihydroxydiphenyl sulphone, 4,4'-dihydroxydiphenyl ketone and 4,4'-dihydroxydiphenyl sulphide. 4,4'-Dihydroxydiphenyl is particularly preferred.

The polyesters according to the invention can contain up to 10 mol% of carbonate groups, relative to the total of ester and carbonate groups, but are preferably free from carbonate groups.

The polyesters according to the invention can contain, as end groups, —COOH, —H, —OH, —OC$_6$H$_5$, acyloxy or radicals originating from chain terminators. Preferred chain terminators are monofunctional aromatic hydroxy compounds, such as 4-hydroxydiphenyl, p-nonylphenol, 4-(1,1,3,3-tetramethylbutyl)-phenol and β-naphthol, and aromatic monocarboxylic acids, such as diphenylcarboxylic acids and naphthalenecarboxylic acids. Chain terminators can be employed in amounts of 0.5–5 mol%, in the case of carboxylic acids relative to the radicals I and in the case of phenols relative to the radicals II.

It is also possible to employ branching trifunctional or polyfunctional—preferably aromatic—monomers in amounts of 0.1–1 mol%, relative to the sum of the radicals I and II, such as, for example, phloroglucinol, 1,3,5-benzenetricarboxylic acid and 3,5-dihydroxybenzoic acid.

As a rule, the polyesters according to the invention have an intrinsic viscosity of at least 0.5, preferably at least 1.0 dl/g (determined on a solution of 5 mg of polyester/ml of p-chlorophenol at 45° C.). If polyesters should be insoluble in p-chlorophenol, it is assumed that they have the minimum viscosity indicated; they are thus in accordance with the invention, provided that they satisfy the parameters of the main claim.

The polyesters according to the invention preferably have a melt viscosity of less than 1,000 Pa.s, determined at a shear rate of $10^3$ s$^{-1}$, using an orifice having a length/diameter ratio of 20 at a temperature below 400° C., preferably below 370° C.

The polyesters according to the invention can be prepared by various processes, for example by condensation or transesterification of the dicarboxylic acids and diphenols derived from the radicals I and II or reactive derivatives thereof, and subsequent polycondensation.

Examples of preferred starting compounds are aryl esters, acyl esters and acid chlorides.

In a preferred process of synthesis, the aryl esters, preferably the phenyl esters, of the dicarboxylic acids derived from the radicals I are reacted with the diphenols derived from the radicals II, it being also possible to prepare the phenyl esters in situ.

The radicals I and II are incorporated in the polyester in the ratio of the starting components.

It can be expedient to accelerate by catalytic means both the condensation or transesterification reactions and the polycondensation reactions. Examples of catalysts of this type are, as is known, Lewis acids and hydrogen halide acids; oxides, hydrides, hydroxides, halides, alcoholates, phenates, salts of inorganic or organic acids (preferably carboxylic acid salts), complex salts or mixed salts of the alkaline earth metals, such as, for example, magnesium or calcium; or the subgroup elements, such as, for example, vanadium, titanium, manganese, cobalt, nickel, zinc, lanthanum, cerium or zirconium, or of elements from other groups of the periodic system, such as, for example, germanium, tin, lead and antimony, or the alkali metals or alkaline earth metals themselves, in particular sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl $C_1$-$C_8$-alkoxides, titanium alkoxides, such as titanium tetrabutylate or titanium tetrapropylate, alkoxytitanium silicates, zirconium butylate, zirconium propylate, titanium tetraphenate, sodium phenate, germanium dioxide, antimony trioxide, dialkyltin oxide, diaryltin oxide, dibutyltin diacetate and dibutyldimethoxytin.

The amounts of catalyst are preferably 0.001–1, in particular 0.01–0.2, % by weight, relative to the total weight of monomers employed.

The polyesters according to the invention can be prepared at temperatures from 150° to 380° C., the reaction generally being started at low temperatures and the temperature being increased continuously in the course of the progress of the reaction. When the reaction rate falls off, a vacuum can be applied, the pressure being preferably reduced continuously from normal pressure down to approximately 0.1 mbar.

The product obtained can be subjected—preferably in the form of granules—to a solid phase after-condensation under reduced pressure at temperatures from 200° to 300° C.; after 1 to 25 hours the molecular weight has increased and the properties of the polyester resulting therefrom have improved markedly.

The invention also relates, therefore, to a process for the preparation of the new polyesters by reacting the dicarboxylic acids and diphenols derived from the radicals I and II or reactive derivatives thereof, which can also be prepared in situ, if appropriate in the presence of catalysts, chain terminators and branching agents, at temperatures from 150° to 380° C., if appropriate under reduced pressure.

Because of their relatively low melt viscosity, the thermotropic polyesters according to the invention can be processed advantageously from the melt to give injection mouldings, filaments, fibres, tapes and films, the result of the shear forces applied being to achieve a molecular orientation which is affected to a great extent by the intensity of the shear forces. Furthermore, they exhibit a pronounced non-newtonian viscosity, that is to say the melt viscosity decreases considerably if the shear forces are increased. Suitable methods of processing are injection moulding, extrusion, compression moulding and melt-spinning.

Shaped articles of excellent stiffness and strength, very high heat distortion point and considerable dimensional stability can be prepared from the polyesters according to the invention. Since the polyesters are extremely resistant to chemicals and flame-retardant, they are preferentially suitable for the production of:

electrical engineering articles, such as, for example, insulators, printed circuits, plugs and instrument components, components in chemical engineering equipment, such as tubes, container linings, rotors, slide bearings and packings, components for the internal equipment of aircraft, and components of medico-technical apparatus, such as, for example, components of air-conditioning plant and valve components.

The polyesters according to the invention can, however, also be used as a material for lining and coating (in powder form or as a dispersion). They are also very suitable for the production of reinforced or filled moulding materials having a content of reinforcement or filler of 5–65% by weight, relative to the reinforced or filled moulding material.

The invention also relates, therefore, to the use of the new polyesters for the production of mouldings, filaments, fibres and films.

EXAMPLES

The testing of impact strength $a_n$ and notched impact strength $a_k$ was carried out on small standard bars as specified in DIN 53,453 (ISO/R 179) at 23° C., in each case using 10 specimens. Determination of flexural strength was carried out on small standard bars as specified in DIN 53,452 (ISO/R 178). The modulus of tensile elasticity and the modulus of flexural elasticity were determined as specified in DIN 53,457. The heat distortion point was measured by determining the Vicat B softening point as specified in DIN 53 460 (ISO/R 306).

Example 1

The following substances were weighed into a 1 l flat-flange vessel, flushed with nitrogen and heated and equipped with a flat-flange lid, a stirrer, a nitrogen inlet and a distillation head:

0.59 mol=249.0 g of diphenyl 3,4'-benzophenonedicarboxylate,
0.41 mol=45.5 g of hydroquinone,
0.18 mol=32.9 g of 4,4'-dihydroxydiphenyl and
0.2 g of 1% strength by weight titanium tetraisopropylate solution in chlorobenzene.

The reaction mixture was melted at 250° C. by means of a salt bath, under a gentle stream of nitrogen, and the elimination of phenol was started by raising the temperature to 290° C. and reducing the pressure to 500 mbar. Phenol was distilled off over a period of 4 hours by gradually increasing the temperature to 360° C. and reducing the pressure to 15 mbar, in the course of which the initially clear melt became cloudy. The elimination of phenol was completed in the course of 20 minutes by reducing the pressure further to 0.5 mbar.

The resulting polyester was ground and subjected to a solid phase after-condensation at 240° C. (15 hours under a pressure of 1 mbar). The intrinsic viscosity of the light beige polyester thus obtained was 1.3 dl/g. An optically anisotropic melt phase was observed within the range from 300° to 400° C.

Thermogravimetric analysis gave a weight loss of 0.2% at an exposure time of 30 minutes and a temperature of 350° C.

Examples 2–9

The reaction apparatus described in Example 1 and the process described therein were used to prepare the polyesters listed in Table 1.

TABLE 1

| Example | 3,4'-BDC (Mol) | TA (Mol) | Hy (Mol) | DOB (Mol) | 2,6-ND (Mol) | intrinsic viscosity (dl/g) | anisotropic phase (°C.) |
|---|---|---|---|---|---|---|---|
| 2 | 0.59 | — | 0.47 | 0.12 | — | 1.4 | 310–400 |
| 3 | 0.59 | — | 0.35 | 0.24 | — | 1.3 | 290–400 |
| 4 | 0.59 | — | 0.30 | 0.29 | — | 1.5 | 295–400 |
| 5 | 0.59 | — | 0.12 | 0.47 | — | 1.4 | 305–400 |
| 6 | 0.59 | — | 0.53 | — | 0.06 | 1.3 | 320–400 |
| 7 | 0.59 | — | 0.47 | — | 0.12 | 1.2 | 305–400 |
| 8 | 0.53 | 0.06 | 0.59 | — | — | insoluble | 335–400 |
| 9 | 0.50 | 0.09 | 0.59 | — | — | insoluble | 345–400 |

3,4'-BDC = 3,4'-Benzophenonedicarboxylic acid
TA = Terephthalic acid
Hy = Hydroquinone
DOB = 4,4'-Dihydroxydiphenyl
2,6-ND = 2,6-Naphthalenediol The mechanical properties were tested by preparing small standard bars and tension bars from the polyesters of Examples 1–9 by injection moulding. The polyesters were processed at temperatures between 310° and 370° C. The values determined are listed in Table 2.

TABLE 2

| Example | Vicat B (°C.) | $a_n/a_k$ (kJ/m$^2$) | Flexural strength (MPa) | Modulus of flexural elasticity (MPa) | Modulus of tensile elasticity (MPa) |
|---|---|---|---|---|---|
| 1 | 191 | 25/13 | 207 | 10,100 | 22,600 |
| 2 | 203 | 22/9 | 215 | 11,300 | 21,300 |
| 3 | 180 | 32/17 | 201 | 10,700 | 19,200 |
| 4 | 184 | 29/18 | 221 | 9,800 | 19,800 |
| 5 | 201 | 19/11 | 214 | 12,800 | 23,100 |
| 6 | 205 | 9/ | 187 | 9,700 | 17,800 |
| 7 | 197 | 17/7 | 195 | 10,500 | 19,100 |
| 8 | 215 | 14/5 | 185 | 9,900 | 19,400 |
| 9 | 221 | 9/6 | 181 | 10,400 | 19,100 |

We claim:

1. Thermotropic polyesters containing recurring units of the formulae

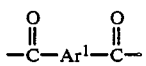 (I)

and

—O—Ar²—O— (II)

wherein
Ar¹ consists to the extent of 80 to 100 mol% of radicals of the formula

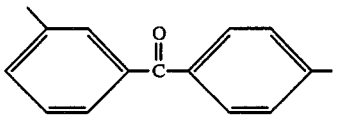 (III)

and to the extent of 20 to 0 mol% of other divalent aromatic radicals which contain 6 to 18 C atoms and in which the chain-lengthening bonds are opposed coaxially or in parallel, and Ar² consists to the extent of 0 to 90 mol% of a 1,4-phenylene radical and to the extent of 100 to 10 mol% of other divalent aromatic radicals which contain 6 to 18 C atoms and in which the chain-lengthening bonds are opposed coaxially or in parallel to the extent of at least 80 mol% and are at an angle to the extent of not more than 20 mol %, subject to the proviso that the I/II molar ratio is 0.95 to 1.05.

2. Polyesters according to claim 1, characterized in that Ar² consists to the extent of 50 to 80 mol% of a 1,4-phenylene radical and to the extent of 50 to 20 mol% of other divalent aromatic radicals which contain 6 to 18 C atoms and in which the chain-lengthening bonds are opposed coaxially or in parallel to the extent of at least 80 mol% and are at an angle to the extent of not more than 20 mol%.

3. Polyesters according to claims 1 and 2, characterized in that the radicals II exclusively represent aromatic radicals having chain-lenghthening bonds which are opposed in parallel or coaxially.

4. Polyesters according to claim 1, characterized in that Ar¹ corresponds exclusively to the formula III.

5. Polyesters according to claim 1, characterized in that Ar² corresponds exclusively to 1,4-phenylene radicals and 4,4'-biphenylene radicals in molar ratios of 9:1 to 0:10.

6. Process for the preparation of the polyesters according to claim 1 by reacting the dicarboxylic acids and diphenols derived from the radicals I and II, or reactive derivatives thereof, which can also be prepared in situ, if appropriate in the presence of chain terminators, branching agents and catalysts, at temperatures of 150°-380° C., if appropriate under reduced pressure.

7. Process according to claim 6, characterized in that a solid phase after-condensation is carried out subsequently.

8. The use of the polyesters according to claim 1 for the production of mouldings, filaments, fibres and films.

* * * * *